(12) United States Patent
Sasaki

(10) Patent No.: US 8,891,005 B2
(45) Date of Patent: Nov. 18, 2014

(54) IMAGING APPARATUS

(75) Inventor: Daisuke Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 13/226,162

(22) Filed: Sep. 6, 2011

(65) Prior Publication Data

US 2012/0062789 A1 Mar. 15, 2012

(30) Foreign Application Priority Data

Sep. 9, 2010 (JP) ................................ 2010-202046

(51) Int. Cl.
*H04N 5/225* (2006.01)
*G03B 17/00* (2006.01)
*G08B 13/196* (2006.01)
*G03B 17/56* (2006.01)
*G03B 37/02* (2006.01)

(52) U.S. Cl.
CPC ........ *H04N 5/2254* (2013.01); *G08B 13/19619* (2013.01); *G03B 17/561* (2013.01); *G08B 13/1963* (2013.01); *G03B 17/568* (2013.01); *G03B 17/00* (2013.01); *G03B 37/02* (2013.01)
USPC ............................ 348/373; 348/375; 396/427

(58) Field of Classification Search
CPC . H04N 5/2251; H04N 5/2252; H04N 5/2253; H04N 5/2254; G08B 13/19619
USPC .................................... 348/373, 375; 396/427
See application file for complete search history.

(56) References Cited

U.S. PATENT DOCUMENTS 7,929,228 B2 * 4/2011 Oikawa ......................... 359/819
2003/0103160 A1 * 6/2003 Tatewaki et al. .............. 348/375

FOREIGN PATENT DOCUMENTS

JP 2003-174572 A 6/2003

* cited by examiner

*Primary Examiner* — Twyler Haskins
*Assistant Examiner* — Quang Le
(74) *Attorney, Agent, or Firm* — Canon USA Inc IP Division

(57) ABSTRACT

An imaging apparatus includes a lens unit including a lens and an image sensor, a lens unit supporting unit for supporting the lens unit, a base unit for supporting the lens unit supporting unit in a manner that can tilt, a fixing base unit for supporting the base unit, a dome cover mounted to the fixing base unit, and an elastic member for elastically supporting the lens unit so that the lens unit can perform a retreat operation in an opposite direction from an object and along an optical axis direction of the lens unit when a force is applied thereto from the dome cover and even if the lens unit supporting unit leans in a tilt direction.

9 Claims, 11 Drawing Sheets

IMAGING APPARATUS

BACKGROUND OF THE INVENTION

1. Field of the Invention

The present invention relates to an imaging apparatus including an impact absorbing mechanism.

2. Description of the Related Art

Conventional monitoring camera apparatuses have a dome cover covering a camera unit which is formed of polycarbonate resin having impact resistance, and an external casing covering a camera body which is formed of metal to provide impact resistance performance. Compared with the external casing formed of the metal, even if the dome cover formed of the resin is not destroyed by the impact, it may be instantaneously, largely deformed. Therefore, when the dome cover receives more than a certain amount of impact, the deformed dome cover may contact and damage an internal construction of the camera unit, and the internal construction may become nonfunctional.

To solve the issue described above, for example, Japanese Patent Application Laid-Open No. 2003-174572 discusses a monitoring camera apparatus including an impact absorbing mechanism. With reference to FIG. 11, the conventional monitoring camera including the impact absorbing mechanism will be described. A rotating base 301 which is a supporting member for supporting a camera unit 300 is fixed to a supporting post of a rotation bracket 302 with an axis screw 304 through an elongated hole 302a provided in a vertical direction of the supporting post. A coil spring 303 is provided between the axis screw 304 and the supporting post. With this arrangement, the rotating base 301 is supported to be rotatable in a tilt direction and to be linearly movable in a vertical direction. Thus, the impact force hitting a cover 305 can be absorbed, and the camera unit 300 can be protected from the damage.

According to the conventional monitoring camera apparatus including the impact absorbing mechanism, since the camera unit 300 can linearly move in the vertical direction, against the impact from the vertical direction of the dome cover, the camera unit 300 can retreat and absorb the impact. However, against the impact from an oblique direction of the dome cover, the camera unit 300 cannot always perform a retreat operation and thus may have been damaged by the impact. The monitoring camera apparatus is often mounted onto a ceiling or a wall surface, and it is necessary to assume that the intentional impact force may be applied from any direction of the dome cover. Thus, it has been an issue that the conventional construction of the monitoring camera apparatus is insufficient.

A clearance between the dome cover and the internal construction of the monitoring camera apparatus becomes smallest between the dome cover and a lens unit. When an intentional impact is applied to the dome cover, a force from the dome cover deformed by the impact is transmitted most to the lens unit. Particularly, most of the force from the dome cover deformed by the impact will be a pressing force onto the lens unit in an optical axis direction. However, the conventional monitoring camera apparatus including the impact absorbing mechanism cannot always perform the retreat operation in the optical axis direction depending on a tilt angle of the camera unit 300.

SUMMARY OF THE INVENTION

The present invention is directed to an imaging apparatus that enables a lens unit to perform a retreat operation against an impact on a dome cover from multiple directions and can effectively absorb, in a state where the lens unit tilts in a tilt direction, a force acting from the dome cover deformed by the impact to the lens unit.

According to an aspect of the present invention, an imaging apparatus that includes an impact absorbing mechanism, the imaging apparatus includes a dome cover, a lens unit covered by the dome cover and including a lens and an image sensor, a supporting unit configured to elastically support the lens unit so that the lens unit is capable of performing a retreat operation in an opposite direction from an object and along an optical axis direction of the lens unit, a base unit configured to support the supporting unit in a manner that can tilt, and a fixing base unit provided with the dome cover and configured to support the base unit.

According to the present invention, the lens unit can perform the retreat operation against the impact on the dome cover from the multiple directions and, in a state where the lens unit tilts in the tilt direction, the force acting from the dome cover deformed by the impact to the lens unit can be effectively absorbed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the disclosure will be described in detail below with reference to the drawings.

Figure 1:
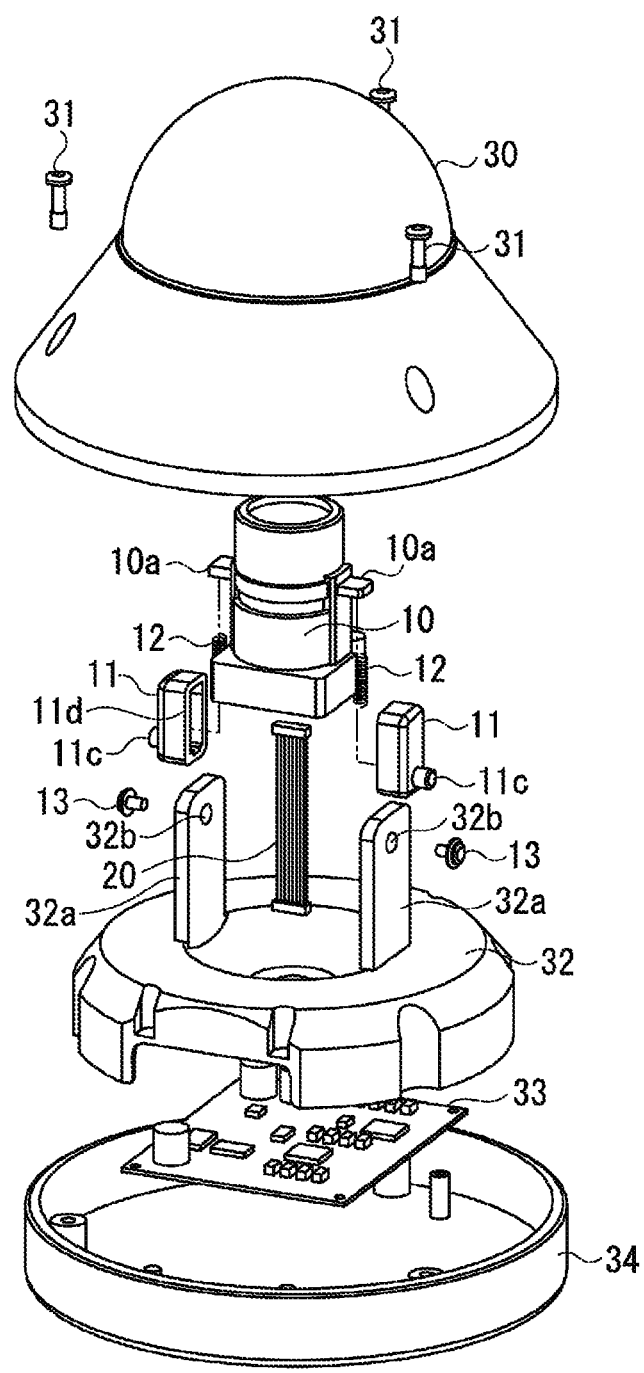
FIG. 1 is a unit assembly diagram of a monitoring camera apparatus according to a first exemplary embodiment.

FIG. 1 is a unit assembly diagram of an imaging apparatus, more specifically, a monitoring camera apparatus, according to a first exemplary embodiment of the present invention. The monitoring camera apparatus according to the present exemplary embodiment includes an impact absorbing mechanism in which a lens unit performs a retreat operation in an optical axis direction. In this specification, a "vertical direction" refers to a vertical direction with respect to a surface on which the imaging apparatus is installed. In the first exemplary embodiment, a "vertical direction" refers to a vertical direction with respect to a surface on which the monitoring camera apparatus is installed, in other words, a vertical direction with respect to a bottom surface of a fixing base unit 34. The vertical direction is also understood to mean a direction substantially perpendicular to a plane established by the surface (i.e. a base unit 32).

A lens unit 10 illustrated in FIG. 1 includes a lens, an image sensor, and a pair of protruding portions 10a at both sides thereof. The lens unit 10 is supported by a pair of lens unit supporting units 11. Each lens unit supporting unit includes a protruding portion 11c and a spring storage portion 11d provided on a surface opposite to a surface on which the protruding portion 11c is provided. The spring storage portion 11d stores an elastic member 12.

Each lens unit supporting unit 11 supports the lens unit 10 via the elastic member 12. The elastic member 12 presses the lens unit 10 toward an object side in parallel to the optical axis direction. With this arrangement, the lens unit 10 is elastically supported to be able to perform a retreat operation toward an opposite side from the object, while moving parallel to the optical axis direction. According to the present exemplary embodiment, a coil spring is used as the elastic member 12, and an elastic member such as rubber may be also used.

Next, a base unit 32 includes a pair of supporting units 32a that are vertically provided thereon, and pivotally supports the protruding portion 11c of the lens unit supporting unit 11 through a hole 32b provided in the supporting unit 32a. A screw hole is formed in the protruding portion 11c of the lens unit supporting unit 11. A falling-out prevention screw 13 is tightened into the screw hole, so that the lens unit supporting unit 11 is mounted on the base unit 32 in a manner that can rotate in a tilt direction thereon.

The fixing base unit 34 fixedly supports the base unit 32 and a mounted substrate 33. Next, an external unit 30 with a dome cover is fixed onto the fixing base unit 34 with mounting screws 31 to cover the internal construction including the lens unit 10. A transmission cable 20 that transmits a signal from the image sensor included in the lens unit 10 is connected to the mounted substrate 33 through a hole provided at a center portion of the base unit 32.

Figure 2:
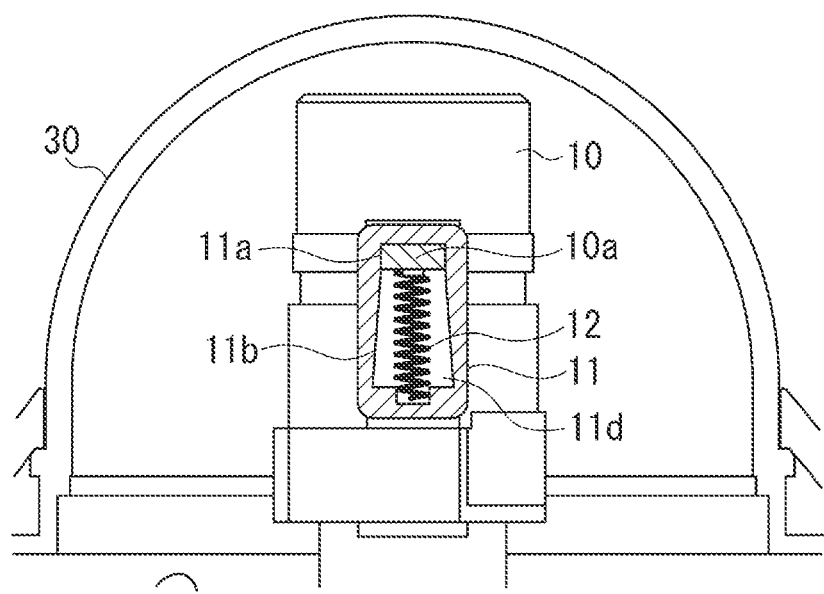
FIG. 2 is a cross sectional view of a lens unit supporting unit 11 according to the first exemplary embodiment.

FIG. 2 is a cross sectional view of the lens unit supporting unit 11. As illustrated in FIG. 2, the spring storage portion 11d includes an engaging groove portion 11a and a taper portion 11b. The engaging groove portion 11a engages with a protruding portion 10a of the lens unit 10, and the taper portion 11b is connectedly provided to gradually increase its width from the engaging groove portion 11a in an opposite direction of the object. The protruding portion 10a is pressed by the elastic member 12 and engages with the engaging groove portion 11a of the lens unit supporting unit 11 and, thus, the lens unit 10 is fixed to a predetermined position and in a predetermined direction. More specifically, the engaging groove portion 11a according to the present exemplary embodiment corresponds to an engaging portion that engages with the protruding portion 10a against an urging force of the elastic member 12 to maintain the lens unit 10 at the predetermined position and direction.

When the dome cover receives a certain impact, the lens unit 10 is pressed in the opposite direction from the object to release an engagement between the protruding portion 10a and the engaging groove portion 11a, and then the lens unit 10 performs the retreat operation. When the impact applied to the dome cover decreases, the protruding portion 10a is pressed by the elastic member 12 and drawn into the engaging groove portion 11a by the taper portion 11b. The protruding portion 10a and the engaging groove portion 11a engage with each other again to return the lens unit 10 to the predetermined position and direction. More specifically, the taper portion 11b according to the present exemplary embodiment corresponds to a drawing unit that draws the lens unit 110 into a predetermined position.

Figure 3:
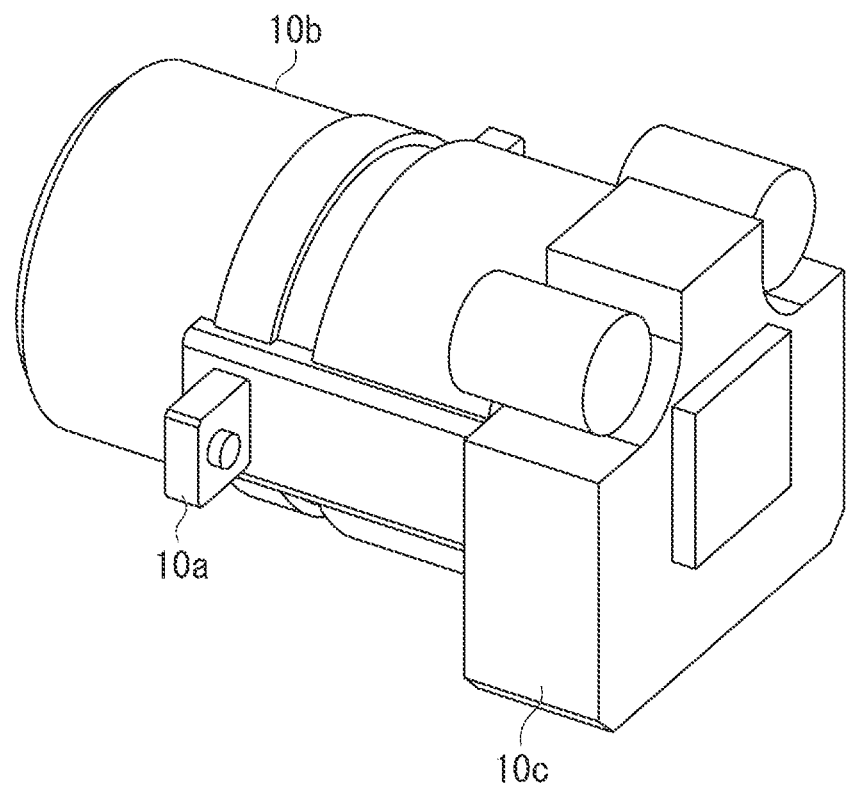
FIG. 3 is a perspective view of a lens unit according to the first exemplary embodiment.
Figure 4:
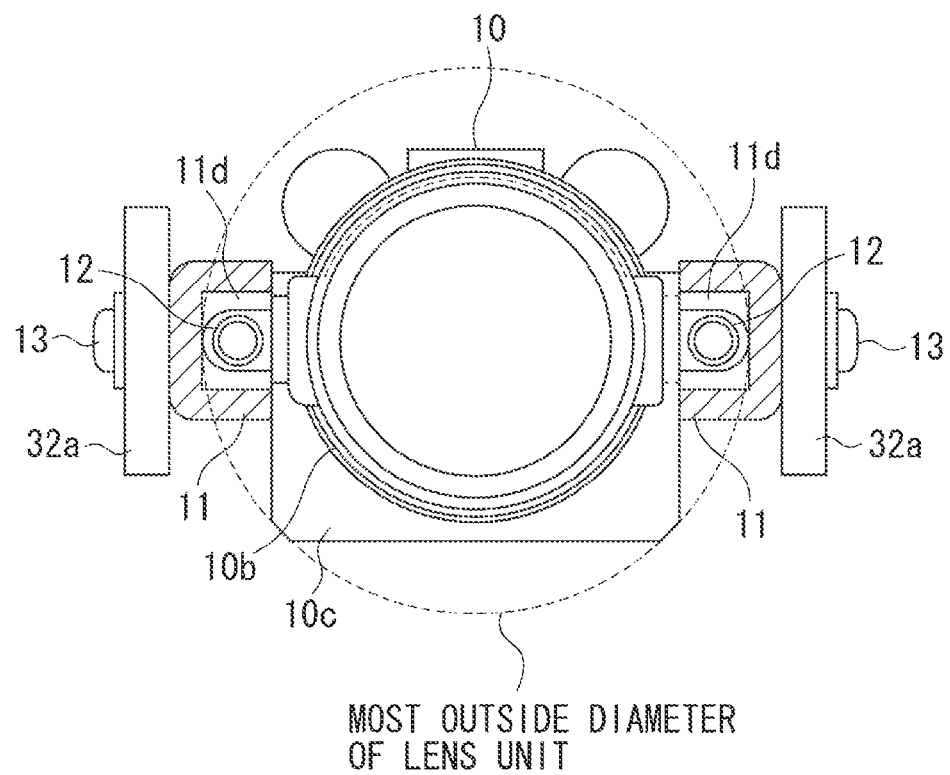
FIG. 4 is a top plan view of the lens unit according to the first exemplary embodiment.

FIG. 3 is a perspective view of the lens unit 10 according to the first exemplary embodiment. FIG. 4 is a top plan view of the lens unit 10 according to the first exemplary embodiment. The monitoring camera apparatus according to the present exemplary embodiment includes an infrared cut filter insertion and removal mechanism while assuming photographing under the low illuminance. Therefore, as illustrated in FIGS. 3 and 4, an area of a projection surface of an image sensor mounting unit 10c with respect to a surface vertical to the optical axis of the lens unit 10 is larger than an area of a projection surface of a lens barrel unit 10b with respect to the surface vertical to the optical axis of the lens unit 10. When a diameter of the lens is small, the area of the projection surface of the image sensor mounting unit 10c tends to be larger than that of the lens barrel unit 10b.

Further, as illustrated in FIG. 4, the elastic member 12 for pressing the protruding portion 10a of the lens unit 10 is disposed inside an outermost diameter of an orbit which is acquired by rotating the lens unit 10 about the optical axis. With this arrangement, without depending on a size of the image sensor mounting unit 10c of a rear portion of the lens unit 10, the monitoring camera apparatus can reduce its size. In FIG. 4, the protruding portion 10a is not illustrated.

Figure 5A:
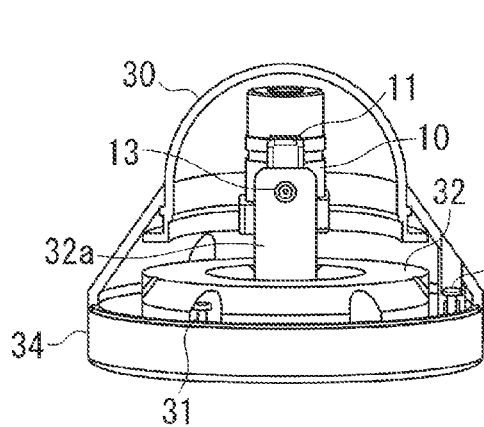
FIGS. 5A to 5D illustrate a retreat operation of the lens unit according to the first exemplary embodiment.
Figure 5B:
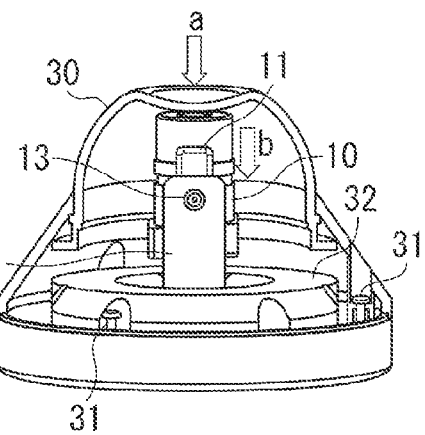
Figure 5C:
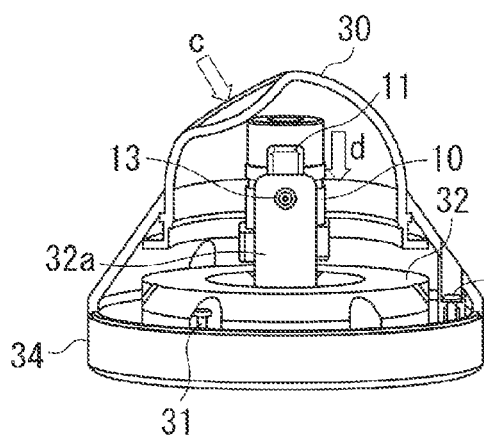
Figure 5D:
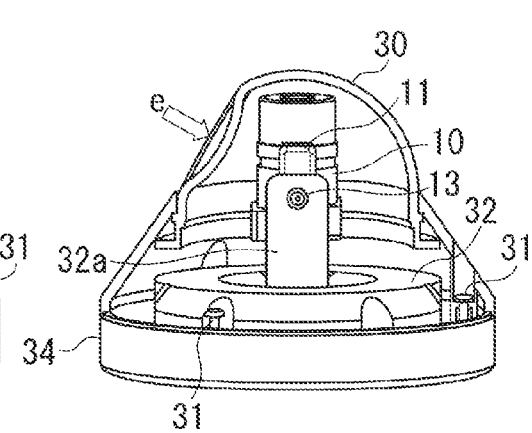

FIGS. 5A, to 5D illustrate a retreat operation of the lens unit 10 when the dome cover receives a certain impact. FIG. 5A illustrates an internal state of the monitoring camera apparatus according to the present exemplary embodiment when the lens unit 10 is fixed in the vertical direction.

When the dome cover receives the impact downward in the vertical direction as indicated with an arrow "a", the dome cover is deformed as illustrated in FIG. 5B and a force is applied to the lens unit 10 from the dome cover deformed by the impact. The force presses the lens unit 10 in the opposite direction from the object and toward the optical axis direction as indicated with an arrow "b". The lens unit 10 performs the retreat operation in the opposite direction from the object and in the optical axis direction.

When the dome cover receives the impact from an oblique direction as indicated with an arrow "c", the dome cover is deformed as illustrated in FIG. 5C, and the force is applied to the lens unit 10 from the dome cover deformed by the impact. This force includes a force pressing the lens unit 10 in the vertical direction with respect to the optical axis and a force pressing the lens unit 10 in the opposite direction from the object and toward the optical axis direction as indicated with an arrow "d", and, in this case, most of the force is composed of the latter force. Therefore, as with the case illustrated in FIG. 5B, the lens unit 10 performs the retreat operation in the opposite direction from the object and toward the optical axis direction.

When the dome cover receives the impact from a further oblique direction as indicated with an arrow "e" (in other words, when an elevation angle of the impact direction is smaller than that illustrated in FIG. 5C), the dome cover is deformed as illustrated in FIG. 5D. Most of the force from the dome cover deformed by the impact is the force in the vertical direction to the optical axis of the lens unit 10. However, the force is not transmitted from the deformed dome cover to the lens unit 10. This is because that a clearance between the dome cover and the lens unit 10 is sufficiently secured, or sufficiently large to ensure the dome cover does not contact, or substantially contact, the lens unit 10.

A movement amount that the lens unit 10 can retreat in the opposite direction from the object and toward the optical axis direction needs to be equal to or more than a distance acquired by subtracting the clearance between the dome cover and a front surface of the lens unit 10 from a deformation amount of the dome cover when receiving a certain impact.

Such a deformation amount that the dome cover is deformed by the certain impact depends on an impact energy, a material giving the impact, and a diameter, a thickness, and a material of the dome cover. For example, when the iron ball gives the impact of 50 J to the dome cover made of polycarbonate having a thickness of 3.5 mm and a diameter of 100 mm, the deformation amount of the dome cover is about 12 mm. If the clearance provided between the dome cover and the front surface of the lens unit 10 is 2 mm, the movement amount that the lens unit 10 can retreat in the opposite direction from the object needs to be equal to or more than 10 mm.

With the construction described above, the lens unit 10 can perform the retreat operation or the clearance between the dome cover and the lens unit 10 can be secured against the impact from multiple directions to the dome cover, so that the dome cover can avoid clashing against the lens unit 10. As a result, the impact force to the dome cover is absorbed and the lens unit 10 can be protected from being damaged.

Further, according to the present exemplary embodiment, the lens unit 10, can always move linearly with respect to the lens unit supporting unit 11 which can tilt. With this arrangement, even when the lens unit supporting unit 11 leans in the tilt direction from the vertical direction (in other words, despite of the tilt direction of the lens unit supporting unit 11), the lens unit 10 can perform the retreat operation against the impact applied to the dome cover from the multiple directions.

Further, when the dome cover receives the impact, the force from the dome cover deformed by the impact tends to be firstly transmitted to the lens unit 10 having the smallest clearance between the dome cover. According to the present exemplary embodiment, the elastic member 12 provided to the lens unit supporting unit 11 applies an urging force to the lens unit 10 toward the object side in the optical axis direction of the lens unit 10. With this arrangement, the impact is absorbed at the lens unit 10 to which the force from the dome cover deformed by the impact tends to be firstly transmitted, and thus the impact transmitted to the internal construction other than the lens unit 10 can be decreased.

A space in which the lens unit 10 pressed by the elastic member 12 moves can be also utilized as a space in which the transmission cable 20 (See FIG. 1) moves following a tilt-rotation adjustment, or a tilt only adjustment of the lens unit 10. When the rotation adjustment in the tilt direction is performed, the transmission cable 20 needs a space for moving following the lens unit 10. According to the present exemplary embodiment, the elastic member 12 is disposed between the lens unit 10 and the lens unit supporting unit 11, so that the space necessary for the transmission cable 20 to move and the space for the lens unit 10 to move can be shared, and the monitoring camera apparatus can be downsized.

Further, the elastic member 12 is provided between the lens unit 10 and the lens unit supporting unit 11, so that the transmission cable 20 can be set longer than a configuration wherein the elastic member 12 is not provided. When the lens unit 10 performs the retreat operation, the transmission cable 20 is bent. However, according to the present exemplary embodiment, a length of the transmission cable can be set longer than when the elastic member 12 is not provided by a variation distance of the elastic member 12 disposed between the lens unit 10 and the lens unit supporting unit 11. With this arrangement, the lens unit 10 can perform the retreat operation in the opposite direction from the object and toward the optical axis direction, and durability for bending the transmission cable 20 can be improved.

When the lens unit 10 is fixed, leaning from the vertical direction to the tilt direction, as with a case where the lens unit 10 is fixed in the vertical direction illustrated in FIG. 5, the lens unit 10 can perform the retreat operation in the opposite direction from the object and toward the optical axis direction.

Figure 6:
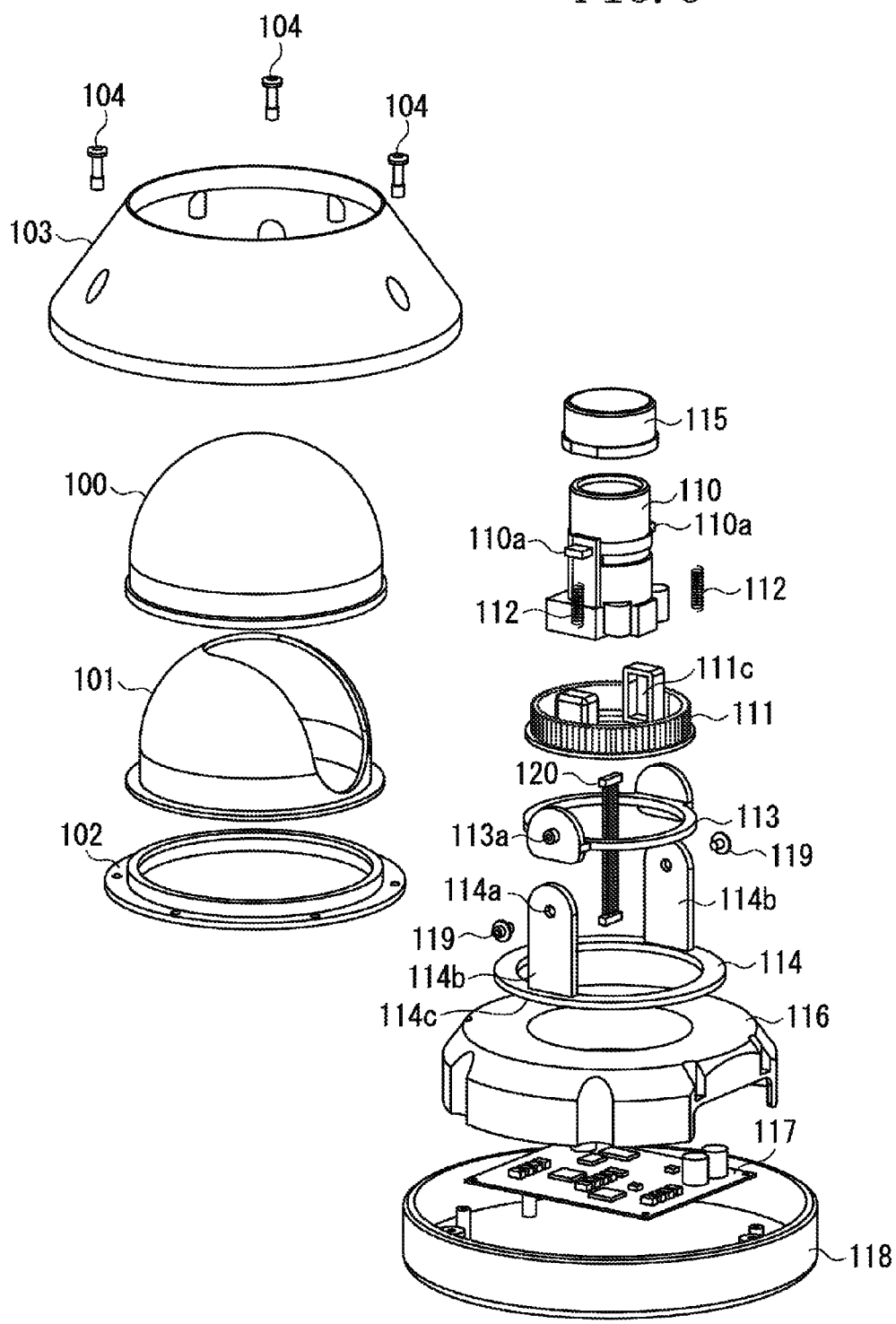
FIG. 6 is a unit assembly diagram of a monitoring camera apparatus according to a second exemplary embodiment.

FIG. 6 is a unit assembly diagram of an imaging apparatus, more specifically, a monitoring camera apparatus, according to a second exemplary embodiment of the present disclosure. The monitoring camera apparatus according to the present exemplary embodiment is similar to that according to the first exemplary embodiment in that the lens unit includes the impact absorbing mechanism for performing the retreat operation in the optical axis direction. However, the present exemplary embodiment is different from the first exemplary embodiment in that the lens unit is rotatably supported about the optical axis.

The vertical direction according to the present exemplary embodiment refers to the vertical direction with respect to a surface on which the monitoring camera apparatus is installed, in other words, the vertical direction with respect to a bottom surface of a fixing base unit 118.

A lens unit 110 illustrated in FIG. 6 includes a lens, an image sensor, and a pair of protruding portions 110a at both sides thereof. The lens unit 110 is supported by a lens unit supporting unit 111. The lens unit supporting unit 111 includes two spring storage portions 111c provided on a surface facing to the lens unit 110, and each spring storage portion 111c stores an elastic member 112.

The lens unit 110 is provided with a lens protection member 115. The lens protection member 115 protects a front lens and a front portion of the lens unit 110 from being damaged, when a dome cover 100 deformed by receiving a certain impact contacts the lens unit 110.

The lens unit supporting unit 111 supports the lens unit 110 via the elastic member 112. The elastic member 112 presses the lens unit 110 toward the object side in parallel to the optical axis direction. With this arrangement, the lens unit 110 is elastically supported to capable of performing the retreat operation toward the opposite side of the object in parallel to the optical axis direction. The lens unit supporting unit 111 is supported by a tilt-rotating unit 113.

The tilt-rotating unit 113 engages with the lens unit supporting unit 111 to rotatably and slidably support the lens unit supporting unit 111 about the optical axis of the lens unit 110. Further, the tilt-rotating unit 113 includes a pair of protruding portions 113a at both sides thereof and is supported by a pan-rotating unit 114 to be able to rotate in a tilt direction.

The pan-rotating unit 114 includes an annular base plate portion 114c and a pair of supporting portions 114b vertically provided thereon. The pan-rotating unit 114 pivotally supports a protruding portion 113a of the tilt-rotating unit 113 via a hole 114a provided in the supporting portion 114b. A screw hole is formed on the protruding portion 113a. A falling-out prevention screw 119 is tightened into the screw hole, so that the tilt-rotating unit 113 is set in the pan-rotating unit 114 in a manner that can rotate and slide in the tilt direction.

A base unit 116 rotatably and slidably support the pan-rotating unit 114 in a pan direction. A fixing base unit 118 fixedly supports the base unit 116 and a mounted substrate 117. A transmission cable 120 that transmits a signal from the image sensor included in the lens unit 110 is connected to the mounted substrate 117 through a hole provided at a center portion of the base unit 116.

An inner cover 101 is held between the dome cover 100 and a dome cover fixing member 102, and rotatably and slidably fixed to an external casing 103 in a pan direction. The inner cover 101 is used to hide the internal mechanism other than the lens unit 110 and provided with a hole portion to avoid an orbit of a shooting range of the lens unit 110 that moves and rotates about the optical axis in the tilt direction.

In a state where the dome cover 100, the inner cover 101, and the dome cover fixing member 102 are assembled, the external casing 103 is fixed to the fixing base unit 118 described below with screws 104 to cover the internal construction including the lens unit 110.

Figure 7:
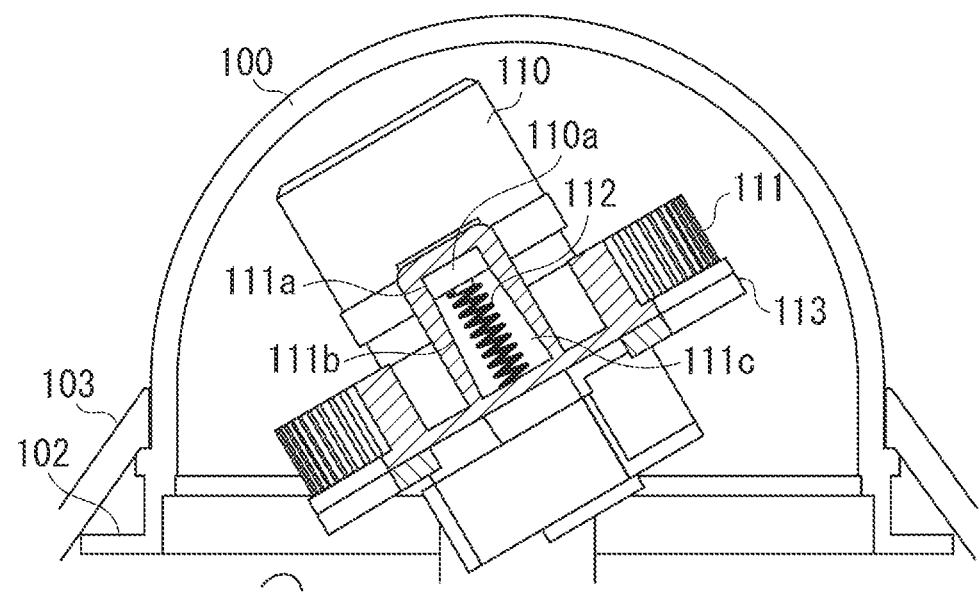
FIG. 7 is a cross sectional view of a lens unit supporting unit according to the second exemplary embodiment.

FIG. 7 is a cross sectional view of the lens unit supporting unit 111. In FIG. 7, the inner cover 101 and the lens protection member 115 are not illustrated.

As illustrated in FIG. 7, the spring storage portion 111c includes an engaging groove portion 111a for engaging with a protruding portion 110a of the lens unit 110 and a taper portion 111b connectedly provided to gradually increase its width from the engaging groove portion 111a in an opposite direction from an object. The protruding portion 110a is pressed to the elastic member 112 so that the lens unit 110 engages with the engaging groove portion 111a of the lens unit supporting unit 111. Thus, the lens unit 110 is fixed at a predetermined position and in a predetermined direction. More specifically, the engaging groove portion 111a according to the present exemplary embodiment corresponds to an engaging portion that engages with the protruding portion 110a against an urging force of the elastic member 112 to maintain the lens unit 110 at the predetermined position and in the predetermined direction.

When the dome cover receives a certain impact, the lens unit 110 is pressed in the opposite direction from the object to release the engagement between the protruding portion 110a and the engaging groove portion 111a, and then the lens unit 110 performs the retreat operation. When the impact applied to the dome cover decreases, the protruding portion 110a is pressed by the elastic member 112 and drawn into the engaging groove portion 111a by the taper portion 111b. The protruding portion 110a and the engaging groove portion 111a engage with each other again to return the lens unit 110 to the predetermined position and direction.

Figure 8:
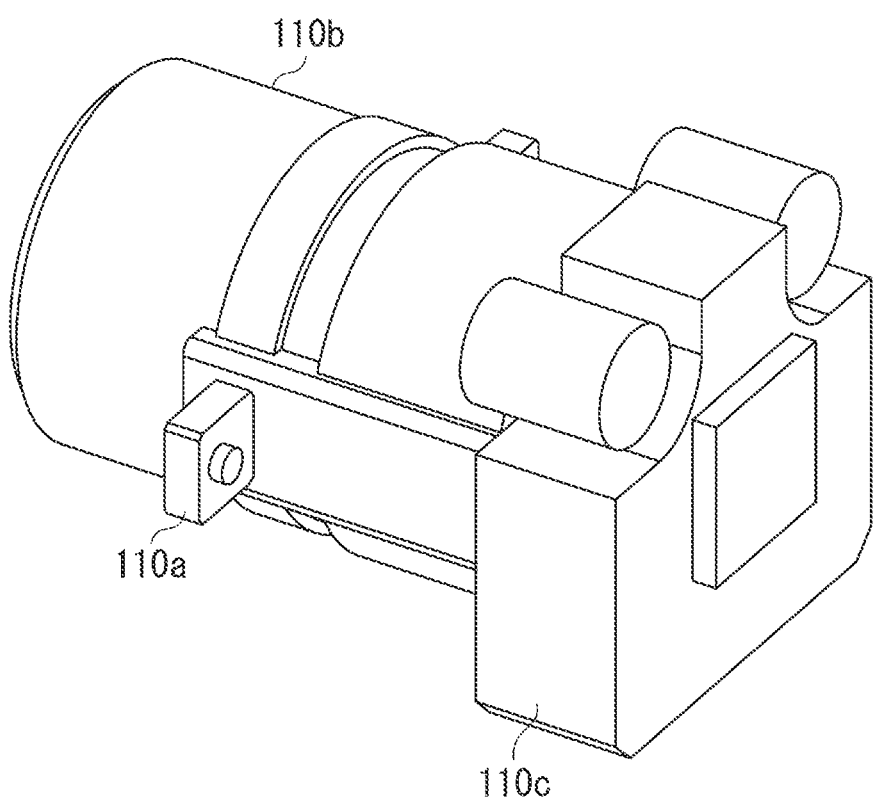
FIG. 8 is a perspective view of a lens unit according to the second exemplary embodiment.
Figure 9:
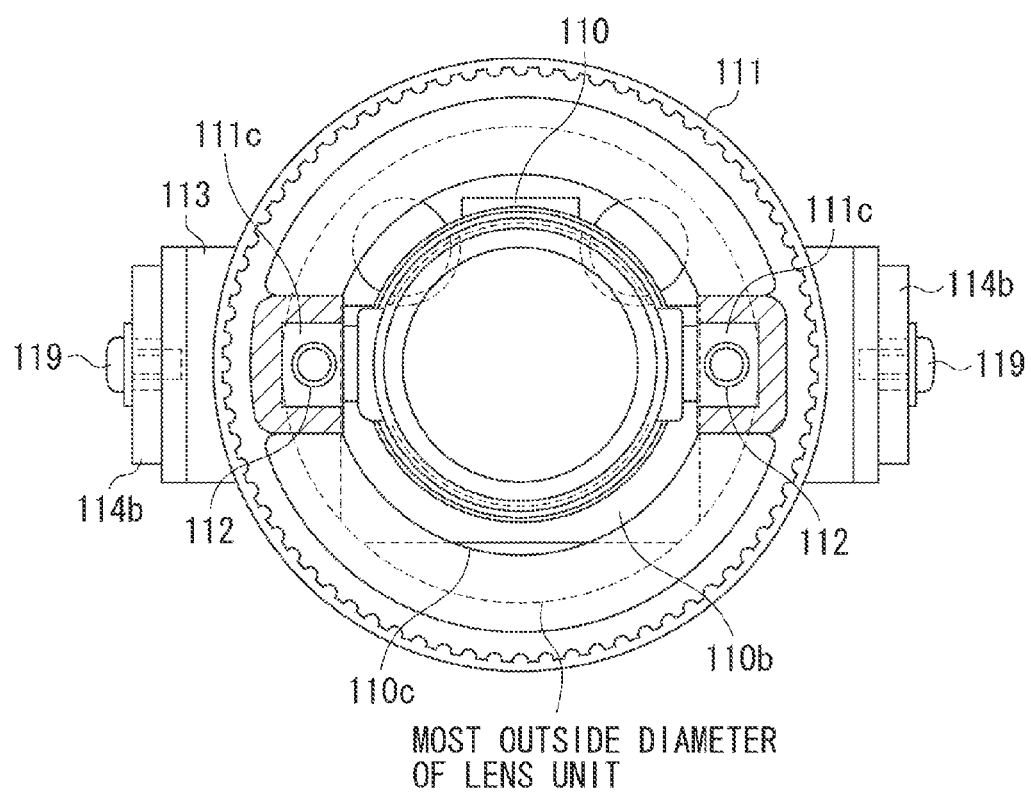
FIG. 9 is a top plan view of the lens unit according to the second exemplary embodiment.

FIG. 8 is a perspective view of the lens unit 110 according to the second exemplary embodiment. FIG. 9 is a top plan view of the lens unit 110 according to the second exemplary embodiment. The monitoring camera apparatus according to the present exemplary embodiment includes an infrared cut filter insertion and removal mechanism while assuming photographing under the low illuminance. Therefore, as illustrated in FIGS. 8 and 9, an area of a projection surface of an image sensor mounting unit 110c with respect to a surface vertical to the optical axis of the lens unit 110 is larger than an area of a projection surface of a lens barrel unit 110b with respect to the surface vertical to the optical axis of the lens unit 110. When a diameter of the lens is small, the area of the projection surface of the image sensor mounting unit 110c tends to be larger than that of the lens barrel unit 110b.

As illustrated in FIG. 9, the elastic member 112 for pressing the protruding portion 110a of the lens unit 110 is disposed inside an outermost diameter of an orbit which is acquired by rotating the lens unit 110 about the optical axis. With this arrangement, without depending on a size of the image sensor mounting unit 110c disposed at a rear portion of the lens unit 110, the monitoring camera apparatus can reduce its size. In FIG. 9, the protruding portion 110a is not illustrated.

FIGS. 10A to 10D illustrate a retreat operation of the lens unit 110 when the dome cover 100 receives a certain impact. FIGS. 10A to 10D do not illustrate the inner cover 101 and the lens protection member 115.

Figure 10A:
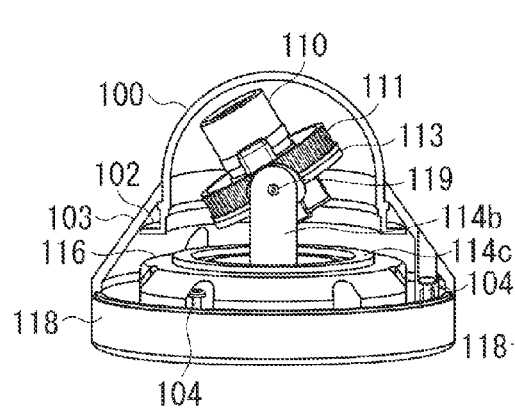
FIGS. 10A to 10D illustrate a retreat operation of the lens unit according to the second exemplary embodiment.

First, FIG. 10A illustrates an internal state of the monitoring camera apparatus according to the present exemplary embodiment when the lens unit 110 is fixed in the oblique direction.

Figure 10B:
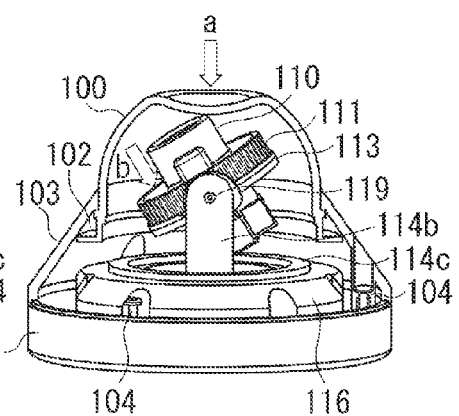

When the dome cover 100 receives the impact downward in the vertical direction as indicated with an arrow "a", the dome cover 100 is deformed as illustrated in FIG. 10B and a force is applied to the lens unit 110 from the dome cover 100 deformed by the impact. This force includes a force pressing the lens unit 110 in the opposite direction from the object and toward the optical axis direction and a force pressing the lens unit 110 in the vertical direction with respect to the optical axis as indicated with an arrow "b", and, in this case, most of the force is composed of the former force. Therefore, the lens unit 110 performs the retreat operation in the opposite direction from the object.

Figure 10C:
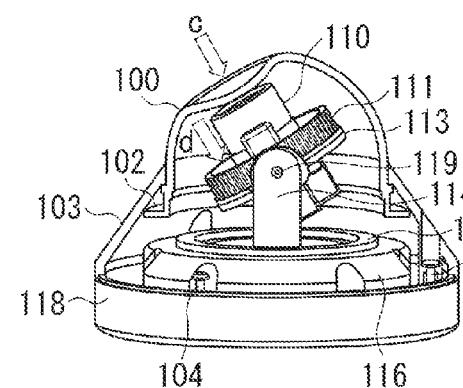

When the dome cover receives the impact from the oblique direction as indicated with an arrow "c", the dome cover 100 is deformed as illustrated in FIG. 10C, and the force is applied to the lens unit 110 from the dome cover 100 deformed by the impact. The force presses the lens unit 110 in the opposite direction from the object and toward the optical axis direction as indicated with an arrow "d". Thus, the lens unit 110 performs the retreat operation in the opposite direction from the object and toward the optical axis direction.

Figure 10D:
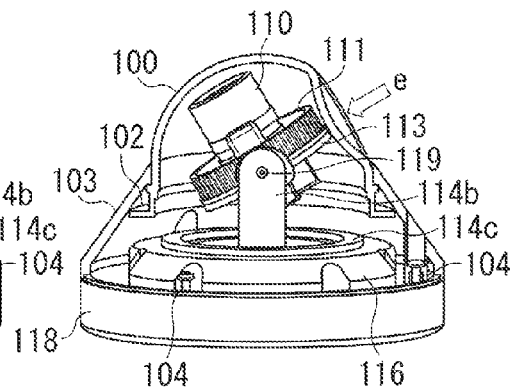
Figure 11:
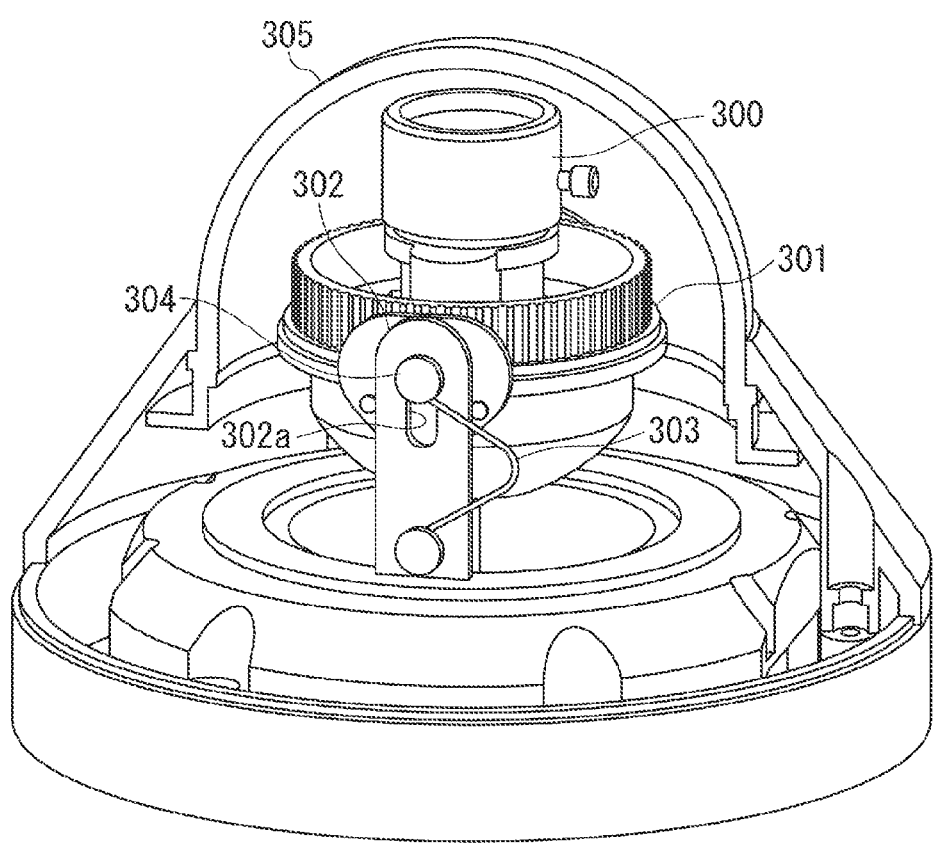
FIG. 11 is an internal construction schematic view of a conventional monitoring camera apparatus including an impact absorbing mechanism.

When the dome cover receives the impact from the further oblique direction as indicated with an arrow "e", the dome cover 100 is deformed as illustrated in FIG. 10D. Most of the force from the dome cover deformed by the impact is the force in the vertical direction to the optical axis of the lens unit 110. However, the force is not transmitted from the deformed dome cover 100 to the lens unit 110. This is because a clearance between the dome cover 100 and the lens unit 110 is sufficiently secured, or sufficiently large to reduce, or eliminate, contact between the dome cover 100 and the lens unit 110.

A movement amount that the lens unit 110 can retreat in the opposite direction from the object and toward the optical axis direction needs to be set as follows. The movement amount needs to be equal to or more than a distance acquired by subtracting the clearance between the dome cover 100 and a front surface of the lens unit 110 including the lens protection member 115 from a deformation amount of the dome cover when receiving a certain impact.

Such a deformation amount that the dome cover 100 is deformed by the certain impact depends on an impact energy, a material giving the impact, and a diameter, a thickness, and a material of the dome cover. For example, when the iron ball gives the impact of 50 J to the dome cover made of polycarbonate having a thickness of 3.5 mm and a diameter of 100 mm, the deformation amount of the dome cover is about 12 mm. If the clearance provided between the dome cover 100 and the front surface of the lens unit 110 including the lens protection member 115 is 2 mm, the movement amount that the lens unit 110 can retreat in the opposite direction from the object needs to be equal to or more than 10 mm.

With the construction described above, even in the monitoring camera apparatus in which the lens unit 110 is supported rotatably about the optical axis, the lens unit 110 can perform the retreat operation against the impact from multiple directions to the dome cover 100. Or, the clearance between the dome cover 100 and the lens unit 110 can be secured, so that the dome cover 100 can avoid clashing against the lens unit 110. As a result, the impact force to the dome cover is absorbed and the lens unit 110 can be protected from being damaged.

According to the present exemplary embodiment, the lens unit 110 can always move linearly with respect to the lens unit supporting unit 111 that can perform tilt-rotation and rotate in the optical axis direction. With this arrangement, even when the lens unit supporting unit 111 leans in the tilt direction from the vertical direction (in other words, despite of the tilt direction of the lens unit supporting unit 111), the lens unit 110 can perform the retreat operation against the impact applied to the dome cover 100 from the multiple directions.

A space in which the lens unit 110 pressed by the elastic member 112 moves can be also utilized as a space in which the transmission cable 120 moves following a tilt-rotation adjustment or an optical axis rotation adjustment of the lens unit 110. When the rotation adjustment in the tilt direction or the optical axis rotation adjustment is performed, the transmission cable 120 needs a space for moving following the lens unit 110.

According to the present exemplary embodiment, the elastic member 112 is disposed between the lens unit 110 and the lens unit supporting unit 111, so that the space necessary for the transmission cable 120 to move and the space for the lens unit 110 to move can be shared, and the monitoring camera apparatus can be downsized.

Further, the elastic member 112 is provided between the lens unit 110 and the lens unit supporting unit 111, so that the transmission cable 120 can be set longer than when the elastic member 112 is not provided. When the lens unit 110 performs the retreat operation, the transmission cable 120 is bent. However, a length of the transmission cable can be set longer than when the elastic member 112 is not provided by a variation distance of the elastic member 112 disposed between the lens unit 110 and the lens unit supporting unit 111.

With this arrangement, the lens unit 110 can perform the retreat operation in the opposite direction from the object and toward the optical axis direction, and durability for bending the transmission cable 120 can be improved.

The inner cover 101 is provided inside the dome cover 100 so that the force from the dome cover 100 deformed by the impact can be prevented from affecting the internal construction other than the lens unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-202046 filed Sep. 9, 2010, which is hereby incorporated by reference herein in its entirety.

What is claimed is:

1. An imaging apparatus that includes an impact absorbing mechanism, the imaging apparatus comprising:
    a dome cover;
    a lens unit covered by the dome cover and including a lens and an image sensor mounted in an image sensor mounting unit;
    a supporting unit having a drawing unit configured to elastically support the lens unit so the lens unit can perform a retreat operation in an opposite direction from a direction of a moving object external to the dome cover and along an optical axis direction of the lens unit, wherein during the retreat operation, the lens unit translates relative to a taper portion of the drawing unit;
    a base unit configured to support the supporting unit in a manner that can tilt; and
    a fixing base unit provided with the dome cover and configured to support the base unit,
    wherein the supporting unit is disposed so as that a projection surface of the image sensor mounting unit on a surface vertical to the optical axis of the lens unit is inside an outermost diameter of an orbit which is acquired by rotating the lens unit about the optical axis.

2. The imaging apparatus according to claim 1, wherein the drawing unit is configured to draw the lens unit into a predetermined position.

3. The imaging apparatus according to claim 2, wherein the drawing unit is provided at the supporting unit.

4. The imaging apparatus according to claim 3, wherein the lens unit further includes a protruding portion, and the taper portion draws the protruding portion into the predetermined position.

5. The imaging apparatus according to claim 4, wherein a width of the taper portion gradually increases toward an opposite direction from the object.

6. The imaging apparatus according to claim 5, wherein the drawing unit further includes an engaging unit configured to maintain the lens unit at the predetermined position by engaging with the protruding portion against an urging force of the supporting unit, and the taper portion is connected to the engaging unit.

7. The imaging apparatus according to claim 1, wherein the lens unit further includes a lens barrel unit, and an area of the projection surface of the image sensor mounting unit on the vertical surface is larger than an area of a projection surface of the lens barrel unit on the vertical surface.

8. The imaging apparatus according to claim 1, further comprising:
    a substrate fixed by the fixing base unit; and
    a transmission cable which passes through a hole provided at a center portion of the base unit to be connected to the substrate and is configured to transmit a signal from the image sensor.

9. An imaging apparatus that includes an impact absorbing mechanism, the imaging apparatus comprising:
    a dome cover;
    a lens unit covered by the dome cover and including a lens and an image sensor mounted in an image sensor mounting unit;
    a supporting unit configured to support the lens unit in a manner that can tilt; and
    a fixing base unit on which the dome cover is mounted and is configured to support the supporting unit; and
    an elastically supporting unit having a drawing unit configured to elastically support the lens unit so the lens unit can perform a retreat operation in an opposite direction from a direction of a moving object external to the dome cover and toward an optical direction of the lens unit wherein during the retreat operation, the lens unit translates relative to a taper portion of the drawing unit, and the drawing unit configured to draw the lens unit into a predetermined position, wherein a projection surface of the image sensor mounting unit on a surface vertical to the optical axis of the lens unit is inside an outermost diameter of an orbit which is acquired by rotating the lens unit about the optical axis.

* * * * *